United States Patent

[11] 3,590,963

| [72] | Inventors | Dennis Wright<br>Altoona;<br>James T. Winkles, Center, both of, Ala. |
|---|---|---|
| [21] | Appl. No. | 814,899 |
| [22] | Filed | Apr. 10, 1969 |
| [45] | Patented | July 6, 1971 |
| [73] | Assignee | Harold D. Harvey<br>Calhoun County, Ala. |

[54] METHOD AND APPARATUS FOR FREEING WHEELS HAVING DISC BRAKES
10 Claims, 3 Drawing Figs.

[52] U.S. Cl..................................................... 188/152,
141/27, 188/1
[51] Int. Cl..................................................... B60t 11/30
[50] Field of Search.......................................... 137/15;
141/22, 23, 27, 311, 318, 320, 322, 363; 188/1,
152.14

[56] References Cited
UNITED STATES PATENTS
| 2,057,723 | 10/1936 | La Brie | 188/152.14 UX |
| 2,217,827 | 10/1940 | Wilkerson | 188/152 (.14) |
| 2,970,673 | 2/1961 | Isbell | 188/152.14 UX |

Primary Examiner—Duane A. Reger
Attorney—Newton, Hopkins, and Ormsby

ABSTRACT: Method and apparatus for freeing vehicular wheels having disc brakes for rotation wherein the method includes the step of imposing a vacuum on the fluid in the wheel cylinder to release the braking pad from the disc so that the disc and wheel assembly can be freely rotated. The apparatus includes a cover for the master cylinder of the braking system and a vacuum pump operatively associated with the cover whereby a vacuum exerted by the pump is imposed on the hydraulic fluid in the braking system to withdraw the braking pad from the disc.

PATENTED JUL 6 1971
3,590,963
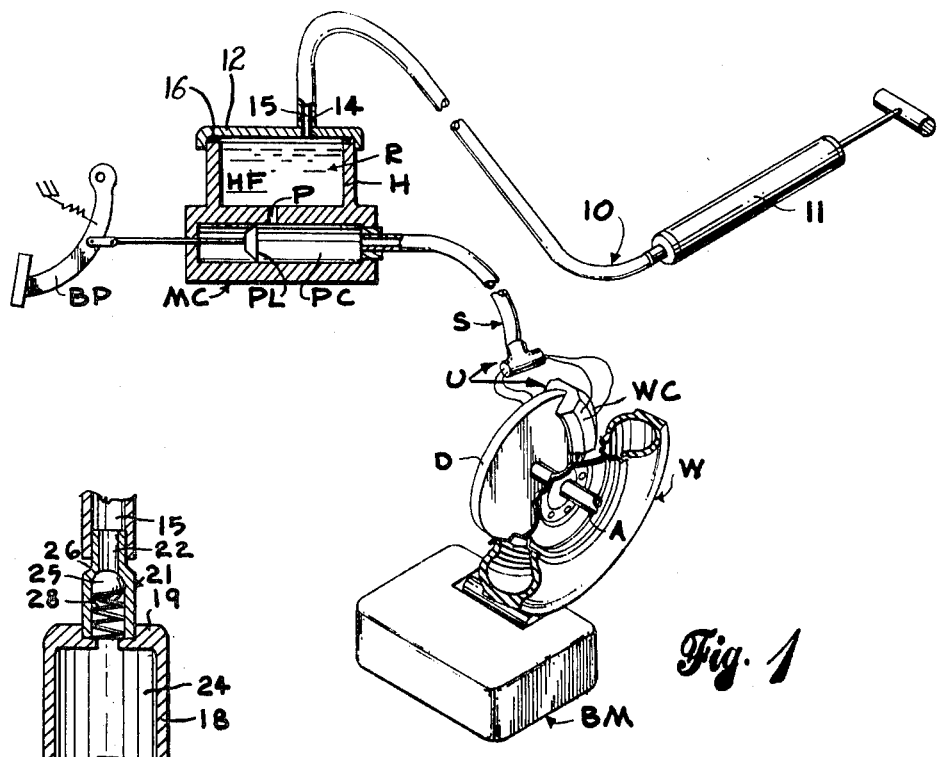
Fig. 1
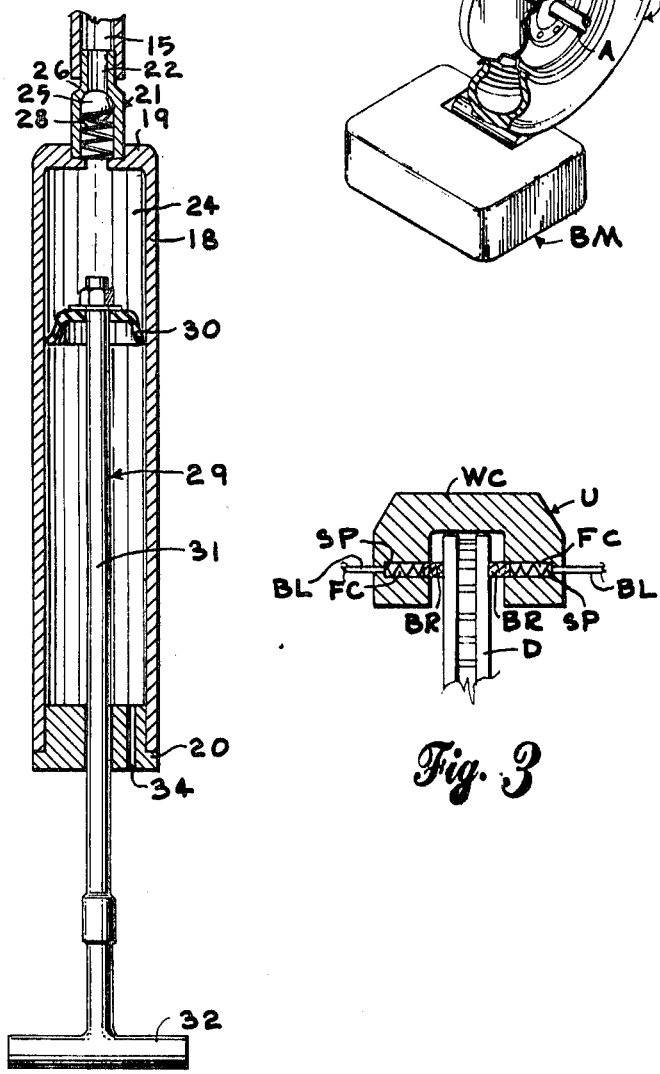
Fig. 2
Fig. 3
INVENTOR
DENNIS WRIGHT
JAMES T. WINKLES
BY Newton Hopkins & Ormsby
ATTORNEYS 3,590,963

1

METHOD AND APPARATUS FOR FREEING WHEELS HAVING DISC BRAKES

BACKGROUND OF THE INVENTION

1. Field of Invention:

This invention relates generally to the freeing of vehicular wheels for rotation having disc brakes and more particularly to the freeing of the wheels for rotation by imposing a vacuum on the fluid in the brake system.

2. Discussion of the Prior Art:

Recently, more and more production automobiles have used disc rather than drum brakes, especially for the front wheels. These disc brakes usually have a spring in the wheel cylinder which constantly urges the brake linings or pads into engagement with their associated disc for the purpose of cleaning the pads and disc as well as keeping the pads dry. This force on the pads, while relatively small, is sufficient to prevent the wheels from being easily rotated. When the wheel is to be balanced on the vehicle, an ordinary spinner-type balancer has insufficient power to properly rotate the wheel for balancing due to the disc brake. This results in frequently burning out the drive motor in the balancer.

SUMMARY OF THE INVENTION

These and other problems associated with the prior art are overcome by the invention described herein in that the brake pads within the disc brakes are withdrawn from engagement with the disc so that the wheel can be freely rotated. This is accomplished by imposing a vacuum on the fluid in the brake system sufficient to overcome the force exerted on the brake pads by the spring so that the brake pads are withdrawn from engagement with the disc.

The apparatus of the invention comprises a cover plate which closes the top of the reservoir in the master cylinder and a vacuum pump communicating with the reservoir in the master cylinder through the cover plate so that a vacuum is imposed on the hydraulic fluid in the brake system when the vacuum pump is manipulated. This withdraws the brake pads from the discs. A check valve is provided which holds the vacuum on the fluid so that the wheel can be freely rotated.

These and other features and advantages of the invention will be more fully understood upon consideration of the following detailed description and accompanying drawings in which like characters of reference designate corresponding parts throughout the several views and wherein:

BRIEF DESCRIPTION OF THE DRAWINGS

FIG. 1 is a schematic perspective view illustrating one embodiment of the invention as installed on a brake system;

FIG. 2 is a longitudinal cross-sectional view of the vacuum pump shown in FIG. 1; and FIG. 3 is a partial cross-sectional view showing the construction of a disc brake.

These figures and the following detail description illustrate specific embodiments of the invention; however, it is understood that the inventive concept is not limited thereto since it may be embodied in other forms.

DESCRIPTION OF ILLUSTRATIVE EMBODIMENTS

Referring to FIG. 1, it will be seen that the freeing mechanism 10 is removably mounted on a vehicular brake system S. The brake system S is a conventional disc brake system having a master cylinder MC and a disc brake unit U for each wheel W of the vehicle (only one of the units U being shown here). The master cylinder MC includes a housing H defining a reservoir R for storing hydraulic fluid HF and a pressure chamber PC connected to the reservoir R by passage P. A movable plunger PL is slidably carried in chamber PC and is connected to the brake pedal BP in conventional manner. As the pedal BP is depressed, plunger PL traps the fluid HF entering the pressure chamber PC through passage P and forces this fluid HF through the brake line BL to each disc brake unit U to activate the unit and apply the appropriate braking force to stop the vehicle (not shown).

The disc brake unit U is of conventional unit which includes a disc D mounted on the axle A of the wheel W of the vehicle and a wheel cylinder WC which extends over the disc D to apply a braking force to the disc D. The wheel cylinder WC includes fluid cavities FC which slidably mount brake pads BR that extend therefrom to engage the disc D. The cavities FC are connected to the brake line BL so that the fluid HF from the master cylinder MC will force the pads BR into engagement with the disc D. To keep a slight pressure on the pads BR, a spring SP is provided in each cavity FC between the pad BR and the wheel cylinder WC. It is the force of the springs SP on the pads BR that prevent the wheel W from being freely rotatable. There may be only one pad BR used if the brake unit U has a free-floating wheel cylinder WC.

The freeing mechanism 10 comprises a vacuum pump 11 and a cover plate 12. The inlet to pump 11 is connected to a nipple 14 on the cover plate 12 so that when the cover plate 12 is in position on the master cylinder MC, a passage 15 connects the inlet of pump 11 with the reservoir R of the cylinder MC. A conventional gasket 16 is placed between the plate 12 and housing H so that the reservoir R is sealed except for the passage 15.

The pump 11 comprises a tubular housing 18 with an end wall 19 at one end thereof and an end wall 20 at the other end thereof. The end wall 19 carries a check valve assembly 21 and defines a passage 22 therethrough in communication with the vacuum chamber 24 defined in the housing 18 and the passage 15 through the check valve assembly 21. The check valve assembly 21 uses a ball check 25 urged toward its valve seat 26 by a spring 28 of conventional construction. The orientation of the valve assembly 21 is such that air will pass from reservoir R through passage 15 into chamber 24 but not vice versa.

A plunger 29 is slidably carried within the chamber 24 to impose a vacuum therein and includes a resilient cup-shaped piston 30 carried by a piston rod 31. The piston 30 is of conventional design and is of a size such that it seals the chamber 24 as the piston rod 31 is withdrawn from chamber 24 but collapses sufficiently to let air pass thereby as the piston rod 31 is inserted in the chamber 24. In this manner a vacuum will be created in the passage 15 and thus reservoir R as the rod 31 is withdrawn. As the rod 31 is inserted, the check valve assembly 21 will continue to hold the vacuum in the passage 15 and thus the reservoir R. A conventional handle 32 is provided on the end of the rod 31 slidably extending through end wall 20 for manipulating piston 30. A port 34 is provided through wall 20 so that air within the chamber 24 is expelled as piston rod 31 is retracted.

OPERATION

When using the apparatus of the invention, the wheel W is raised from the floor and the conventional cover (not shown) is removed from the master cylinder MC to expose the reservoir R. The cover plate 12 is installed as seen in FIG. 1 with the gasket 16 between the plate 12 and housing H to seal the reservoir R except to passage 15. The plate 14 is clamped in position as was the cover of the master cylinder MC.

The handle 32 is pulled to retract the piston rod 31 from chamber 24 and move the piston 30 away from check valve assembly 21 thus creating a vacuum in passage 15 and reservoir R. If the first stroke of piston 30 does not create a sufficient vacuum in reservoir R, then a second stroke can be taken to create a greater vacuum. When piston 30 is returned, check valve assembly 21 maintains the vacuum in passage 15 and reservoir R. The vacuum will be maintained until the cover plate 12 is removed from the master cylinder MC.

No hydraulic fluid HF will be withdrawn from the system since there is no air leakage into the system if the system is in a safe, properly functioning condition. If there is leakage, the mechanic will be able to repair the system before failure thereof.

The pump 11 is manipulated until a sufficient vacuum has been imposed on the hydraulic fluid in the system to overcome the force of the springs SP on the brake pads BR and withdraw the pads BR from the disc D so that the wheel W is freely rotatable. While the amount While the amount of vacuum required may vary for different vehicles, it has been found that a vacuum of 5 to 10 inches of mercury is usually sufficient to free the wheels W.

After the wheels W are freely located, they may be manipulated in known manner such as by a balancing machine BM shown in FIG. 1. After the wheels W have been manipulated, the cover plate 12 is removed to release the vacuum, the original cover (not shown) replaced and the wheels W lowered.

While specific embodiments have been disclosed, it is understood that modifications, substitutions, and equivalents may be used without departing from the scope of the invention.

We claim:

1. A method of freeing vehicular wheels for rotation equipped with a hydraulic disc brake system having wheel cylinders with brake pads extendable therefrom under hydraulic pressure comprising the step of:
   imposing a vacuum on the hydraulic fluid in the wheel cylinder of sufficient magnitude to withdraw the brake pads away from the brake disc to release the associated wheel for free rotation.

2. The method of claim 1 wherein the brake system has a master cylinder with a fluid reservoir operationally connected to said wheel cylinder and wherein the vacuum is imposed by imposing a vacuum in the reservoir.

3. The method of claim 2 further including the step of sealing the reservoir from the atmosphere before imposing the vacuum.

4. The method of claim 1 wherein the vacuum magnitude is at least 5 inches of mercury.

5. The method of claim 2 wherein the vacuum magnitude is between 5 and 10 inches of mercury.

6. Apparatus for freeing vehicular wheels for rotation equipped with a hydraulic disc brake system having wheel cylinders with brake pads extendable therefrom under hydraulic pressure and a master cylinder having a reservoir containing hydraulic fluid and operatively connected to the wheel cylinders including:
   a vacuum pump operatively connected to said reservoir for imposing a vacuum on the hydraulic fluid in the reservoir and thus on the fluid in the wheel cylinder of sufficient magnitude to withdraw the brake pads away from the brake disc to release the associated wheel for free rotation.

7. The apparatus of claim 6 wherein said vacuum pump is connected to said reservoir by means of a removable cover plate that when positioned on said reservoir seals said reservoir to the atmosphere.

8. The apparatus of claim 7 wherein said vacuum pump includes:
   a housing defining a chamber therein;
   passage means connecting said chamber to the reservoir when said cover plate is in place on the master cylinder; and,
   a piston slidably received in said chamber constructed and arranged to create a vacuum in said passage means and the reservoir when said piston is moved in a first direction.

9. The apparatus of claim 8 wherein said vacuum pump includes a check valve assembly connecting said passage with said chamber constructed and arranged to permit withdrawal of air from said passage and the reservoir, and to preclude the introduction of air to the reservoir through the passage.

10. The apparatus of claim 9 wherein said piston is a cup-shaped resilient member constructed and arranged to seal said chamber and produce a vacuum in said passage and the reservoir as said piston is moved away from said passage, and to collapse to allow air trapped between said passage and said piston to pass said piston as said piston is moved toward said passage.